United States Patent
Ogle (10) Patent No.: US 9,796,912 B2
(45) Date of Patent: Oct. 24, 2017

(54) SELF-ASSEMBLING MATERIALS FOR WELLBORE SERVICING AND METHODS OF USING SAME

(75) Inventor: James W. Ogle, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 471 days.

(21) Appl. No.: 13/591,032

(22) Filed: Aug. 21, 2012

(65) Prior Publication Data

US 2014/0057812 A1 Feb. 27, 2014

(51) Int. Cl.

| C09K 8/524 | (2006.01) |
|---|---|
| C09K 8/60 | (2006.01) |
| C09K 8/528 | (2006.01) |
| E21B 43/00 | (2006.01) |
| C09K 8/78 | (2006.01) |
| C09K 8/68 | (2006.01) |
| C09K 8/80 | (2006.01) |
| C09K 8/88 | (2006.01) |

(52) U.S. Cl.
CPC ............ *C09K 8/68* (2013.01); *C09K 8/602* (2013.01); *C09K 8/685* (2013.01); *C09K 8/80* (2013.01); *C09K 8/882* (2013.01); *C09K 8/887* (2013.01)

(58) Field of Classification Search
CPC ........ C09K 8/56; C09K 8/575; C09K 8/5756; C09K 8/62; C09K 8/68; C09K 8/685; C09K 8/80; Y10S 507/924
USPC ....... 507/261, 266, 204, 224, 230, 234, 237, 507/253, 264
See application file for complete search history.

(56) References Cited

U.S. PATENT DOCUMENTS

| 4,194,565 A * | 3/1980 | Kalfoglou ............... 166/275 |
|---|---|---|
| 4,325,433 A | 4/1982 | Yen et al. |
| 4,488,975 A | 12/1984 | Almond |
| 4,781,976 A * | 11/1988 | Fujita et al. .......... 428/318.6 |
| 5,372,732 A | 12/1994 | Harris et al. |
| 6,311,773 B1 * | 11/2001 | Todd et al. ............ 166/280.2 |
| 7,297,665 B2 | 11/2007 | Harris et al. |
| 7,325,615 B2 | 2/2008 | Kriegel et al. |
| 2005/0018310 A1 * | 1/2005 | Kornfield et al. ........ 359/642 |
| 2006/0260813 A1 * | 11/2006 | Welton et al. ......... 166/280.2 |
| 2012/0004148 A1 | 1/2012 | Ogle et al. |

FOREIGN PATENT DOCUMENTS

WO 8600330 1/1986

OTHER PUBLICATIONS

Carn, et al., "Three-Dimensional Opal-Like Silica Foams," Langmuir, 2006, pp. 5469-5475, vol. 22, American Chemical Society.

(Continued)

*Primary Examiner* — Aiqun Li
(74) *Attorney, Agent, or Firm* — Craig W. Roddy; Baker Botts L.L.P.

(57) ABSTRACT

A method of servicing a wellbore penetrating a formation comprising placing a wellbore servicing fluid comprising a modified proppant pack into the wellbore or formation wherein the modified proppant pack comprises a proppant and a self-assembly directing material. A modified proppant pack comprising a proppant and a self-assembly directing material comprising a water-soluble moiety, an oil-soluble moiety and a crosslinkable moiety.

10 Claims, 2 Drawing Sheets

(56) References Cited

OTHER PUBLICATIONS

Chen, et al., "Synthesis of CO2-philic Xanthate-Oligo (vinyl acetate)-Based Hydrocarbon Surfactants by RAFT Polymerization and Their Applications on Preparation of Emulsion-Templated Materials," Macromolecules, 2010, p. 9355-9364, vol. 43, American Chemical Society.
Gitli, et al., "Bicontinuous Hydrogel-Hydrophobic Polymer Systems Through Emulsion Templated Simultaneous Polymerizations," Soft Matter, 2008, p. 2475-2485, vol. 4, The Royal Society of Chemistry.
Koehler, et al., "Microstructure and Dynamics of Wormlike Micellar Solutions Formed by Mixing Cationic and Anionic Surfactants," J. Phys. Chem. B., 2000, p. 11035-11044, vol. 104, American Chemical Society.
Porcar, L., et al., "Topological Relaxation of a Shear-Induced Lamellar Phase to Sponge Equilibrium and the Energetics of Membrane Fusion," Physical Review Letters, 2004, p. 198301-1-198301-4, vol. 93, No. 19, The American Physcial Society.
Shen, et al., "Interfacial Molecular Imprinting in Nanoparticle-Stabilized Emulsions," Macromolecules, 2011, pp. A-G, ACS Publications, American Chemical Society.

\* cited by examiner

SELF-ASSEMBLING MATERIALS FOR WELLBORE SERVICING AND METHODS OF USING SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Field

This disclosure relates to servicing a wellbore. More specifically, it relates to methods of maintaining or improving fluid conductivity in a wellbore.

Background

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

Proppant packs are typically introduced into the wellbore and surrounding formation during fracturing and completion operations in order to provide a structural frame for both downhole support and fluid collection. Conventional proppant packs comprise sands which function to provide structural support for the formation and allow the flow of fluid (e.g., oil or gas) for collection. The proppant pack conductivity may decrease over time and as a result the amount of resources collected (e.g., hydrocarbons) will decrease over time. Thus an ongoing need exists for a proppant packs that would retain fluid conductivity over time and hence increase the lifetime of the wellbore.

SUMMARY

Disclosed herein is a method of servicing a wellbore penetrating a formation comprising placing a wellbore servicing fluid comprising a modified proppant pack into the wellbore or formation wherein the modified proppant pack comprises a proppant and a self-assembly directing material.

Also disclosed herein is a modified proppant pack comprising a proppant and a self-assembly directing material comprising a water-soluble moiety, an oil-soluble moiety and a crosslinkable moiety.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are methods of servicing a wellbore. In an embodiment the method comprises placing a wellbore servicing fluid (WSF) (e.g., a fracturing fluid) comprising a modified proppant pack into a wellbore. The method may further comprise allowing the modified proppant pack to self-assemble into discrete structures. Herein self-assembly refers to the ability of the modified proppant to arrange into an organized pattern of particles as a consequence of specific, local interactions among the components of the modified proppant without external direction. Herein a discrete structure refers to an individually separate or distinct ordering of the particles into an assemblage that is capable of supporting loads. Modified proppant packs and methods of assembling same are described in more detail herein.

In an embodiment, a method of servicing a wellbore comprises placing a WSF comprising a modified proppant pack into the wellbore. In an embodiment, the modified proppant pack comprises a proppant and a self-assembly directing material (SADM).

In an embodiment, the SADM comprises a surfactant capable of self-assembly. In such embodiments, the SADM may be characterized by the presence of three distinct moieties designated a water-soluble moiety, an oil-soluble moiety, and a crosslinkable moiety. The water-soluble moiety, oil-soluble-moiety and crosslinkable moiety may be arranged in any suitable manner. In an embodiment, the SADM has the oil-soluble moiety situated between the water-soluble moiety and crosslinkable moiety. In an embodiment, the SADM directs the self-assembly of the proppant pack, contributing to the formation of discrete structures that provide a conduit or pathway for fluid flow. Such discrete structures may be of a transient nature depending on the surrounding conditions, and the crosslinkable moiety of the SADM may be crosslinked to increase the structural integrity of the discrete structures once formed. The moieties of the SADM are described independently herein as comprising a compound or material. It is to be understood that the moieties present in the SADM are derived from the materials and/or compounds disclosed herein. Thus, some of the moieties described herein will be depicted and/or understood as having one or more free valencies which may serve as sites with which the moiety connects with, reacts with, or bonds to other moieties and/or portions (e.g., a frame, a ligand, a backbone, etc.) of the SADM. Methods for preparing a SADM having a water-soluble moiety, an oil-soluble moiety, and a crosslinkable moiety are disclosed herein.

In an embodiment, the water-soluble moiety of the SADM comprises a moiety derived from a water-soluble polymer, a water-soluble macromer, a water-soluble oligomer, or combinations thereof. Derivation of the water-soluble moiety of the SADM from the disclosed materials may comprise any modification that renders the material suitable for incorporation into a SADM. For example, a suitable moiety for incorporation into the SADM may be a polymer having a free valence due to the removal of a hydrogen from the molecule.

Examples of the water-soluble moieties that may be suitably employed in formation of the SADM include but are not limited to moieties derived from polymers such as polyethylene glycol, polyacrylic acid (e.g., polyacrylates), polyacrylamide, polyacrylonitrile, polyethylene derivatives such as polyethylene phosphonates, polystyrenyl derivatives such as polystyrenyl sulphonate, polyvinyl imidazoles, polypyrolidones, or combination thereof.

In an embodiment, the water-soluble moiety of the SADM comprises a polyethylene glycol characterized by Structure I:

Structure I

For various structures the water-soluble moieties and the crosslinkable moieties are bordered by a single wavy line which designates the remainder of the surfactant molecule irrespective of hydrophobicity. The oil-soluble moieties are bordered on both sides by wavy lines, indicating that the oil-soluble moiety is disposed between the water-soluble moiety and cosslinkable moiety.

In an embodiment, the water-soluble moiety of the SADM comprises a polyacrylate characterized by Structure II:

Structure II wherein $R_1$ is hydrogen, a $C_1$-$C_{16}$ alkyl group, or combinations thereof.

In an embodiment, the water-soluble moiety of the SADM comprises a polyacrylamide derivative characterized by Structure III:

Structure III wherein $R_2$ is selected from the group consisting of: hydrogen, a $C_1$-$C_{16}$ alkyl group, and any combination thereof.

In an embodiment, the water-soluble moiety of the SADM comprises a polyethylene phosphonate characterized by Structure IV:

Structure IV

In an embodiment, the SADM comprises an oil-soluble moiety. Examples of oil-soluble moieties that may be suitably employed in formation of the SADM include but are not limited to compounds such as Al-based compounds, Si-based compounds (e.g., siloxanes), cyclic structures with side chains, compounds characterized by Structure V and/or Structure VI, or combinations thereof;

Structure V

Structure VI wherein $R_3$ and $R_4$ are hydrogen, a $C_1$-$C_{16}$ alkyl group, or combinations thereof. In an embodiment, the oil-soluble moiety is characterized by Formula I:

Formula I

In an embodiment, the oil-soluble moiety of the SADM comprises a hydrophobic siloxane compound characterized by Structure VII:

Structure VII wherein $R_5$ is a $C_1$-$C_{16}$ alkyl group.

Referring to Structures I-VII, the atoms in parentheses represent repeating units of the formula where the repeating units may occur n times with the value of n ranging from about 1 to about 1000, alternatively from about 1 to about 500, alternatively from about 2 to about 50, alternatively from about 2 to about 10, alternatively from about 2 to about 5, or alternatively from about 2 to about 4.

In an embodiment, the SADM comprises a crosslinkable moiety. Examples of materials that may be suitably employed as the crosslinkable moiety of the SADM include but are not limited to sugars (e.g., galactose, mannose) and sugar derivatives, benzenediols (e.g., catechol) and benzenediol derivatives, cyclic succinate species (e.g., succinic anhydride), furanyl and furanyl derivatives, tetrahydrofuran derivatives, or combinations thereof.

In an embodiment, the crosslinkable moiety of the SADM comprises a sugar derivative of the type characterized by Structure VIII.

Structure VIII

In an embodiment, the crosslinkable moiety of the SADM comprises a catechol derivative of the type characterized by Structure IX.

Structure IX

In an embodiment, the crosslinkable moiety of the SADM comprises a succinic anhydride derivative of the type characterized by Structure X.

Structure X

In an embodiment, the crosslinkable moiety of the SADM comprises a furanyl derivative of the type characterized by Structure XI.

Structure XI

In an embodiment, the crosslinkable moiety comprises malonate. Examples of malonates that may be employed as the crosslinkable moiety include without limitation diethyl malonate, dimethyl malonate, disodium malonate, or combinations thereof.

In an embodiment, the crosslinkable moiety comprises gallic acid (i.e., 3,4,5-trihydroxybenzoic acid) or gallic acid derivatives (i.e, gallates). Alternatively, the crosslinkable moiety comprises polyvinyl alcohol.

In an embodiment, the SADM is a surfactant comprising a water-soluble moiety, an oil-soluble moiety, and a crosslinkable moiety, all of the type described herein. The water-soluble moiety, oil-soluble moiety, and crosslinkable moiety may be associated with each other using any suitable methodology. In an embodiment, the water-soluble moiety, oil-soluble moiety, and crosslinkable moiety are covalently bound to one another to result in a molecule able to function as a SADM. Any reaction capable of covalently bonding the water-soluble moiety, oil-soluble moiety, and crosslinkable moiety to form an SADM of the type disclosed herein may be employed. For example, the crosslinkable moiety of the SADM may be attached through a Michael addition reaction to a molecule having both a water-soluble moiety and an oil-soluble moiety. A Michael addition reaction is defined as a 1,4-addition of a doubly stabilized carbon nucleophile to an $\alpha,\beta$ unsaturated carbonyl compound. Some examples of nucleophiles in the Michael addition reaction include without limitation beta-ketoesters, malonate species such as diethyl malonate, dimethyl malonate, and disodium malonate or beta-cyanoesters. Classical examples of the Michael reaction are the reaction between diethyl malonate (Michael donor) and diethyl fumarate (Michael acceptor); that of mesityl oxide and diethyl malonate; that of diethyl malonate and methyl crotonate; that of 2-nitropropane and methyl acrylate, that of ethyl phenylcyanoacetate and acrylonitrile and that of nitropropane and methyl vinyl ketone. The exact conditions for carrying out the Michael addition reaction to form an SADM of the type disclosed herein will be dependent on the nature of the reactants and may be carried out using any suitable methodology.

In an embodiment, an SADM of the type disclosed herein is contacted with a proppant to form a modified proppant pack. The proppant may be a naturally-occurring material, a synthetic material, or a combination thereof. Examples of proppants suitable for use in this disclosure include without limitation ground or crushed shells of nuts such as walnut, pecan, almond, ivory nut, brazil nut, etc.; ground or crushed seed shells (including fruit pits) of seeds of fruits such as plum, peach, cherry, apricot, etc.; ground or crushed seed shells of other plants such as maize (e.g. corn cobs or corn kernels), etc., crushed fruit pits or processed wood materials such as those derived from woods such as oak, hickory, walnut, poplar, mahogany, etc. including such woods that have been processed by grinding, chipping, or other form of particleization, glass, sintered bauxite, quartz, aluminum pellets, silica (sand) (such as Ottawa, Brady or Colorado Sands), synthetic organic particles such as nylon pellets, ceramics (such as aluminosilicates), and mixtures thereof. In an embodiment, the proppant comprises a resin-coated naturally-occurring sand.

In an embodiment, the modified proppant pack is formed when the proppant is associated with the SADM. Nonlimiting means of associating the proppant with the SADM include absorption, coating, impregnation, covalent bonding, or combinations thereof. In an embodiment, the modified proppant pack is formed when the proppant is contacted with the SADM.

Figure 1:
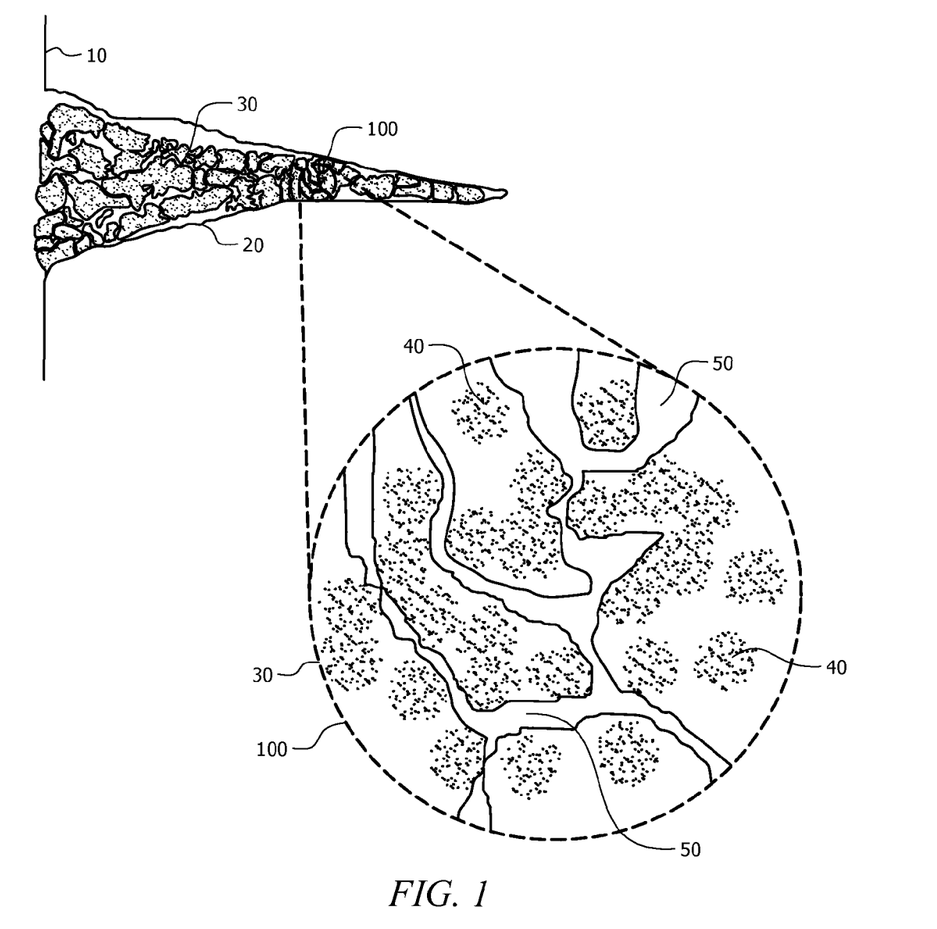
FIG. 1 is a depiction of self-assembled channels.

In an embodiment, the proppant particles in the modified proppant pack form discrete structures when exposed to ambient wellbore conditions in a process that is directed by an SADM of the type disclosed herein. Herein ambient wellbore conditions refer to temperatures in the range of from about 80° F. to about 400° F., alternatively from about 100° F. to about 400° F., alternatively from about 250° F. to about 400° F., or alternatively from about 80° F. to about 250° F. and pressures in the range of from about 1000 psi to about 15000 psi, alternatively from about 2000 psi to about 10000 psi or alternatively from about 5000 psi to about 10000 psi. Without wishing to be limited by theory, self-assembly of the proppant particles is directed by the SADM which will spontaneously form discrete structures under ambient wellbore conditions. Such discrete structures may allow for the formation of interconnected channels within a fracture that maintain or improve fluid conductivity. This is schematically illustrated in FIG. 1, where the formation 10 comprises fractures 20 wherein a modified proppant pack of the type disclosed herein is disposed 30. A magnified section of the fracture 20 is depicted 100. Referring to the magnified section 100, individual particles of the modified proppant pack 40 may self-assemble into discrete structures characterized by the presence of interconnected channels 50.

Figure 2A:
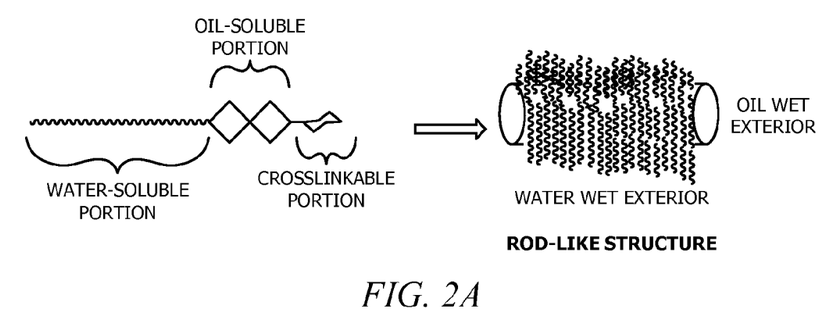
FIG. 2 is a schematic of surfactant assembly.

As will be understood by one of ordinary skill in the art, the discrete structure type formed will depend on the nature of the SADM. In an embodiment, the SADM may generate a network of rod-like or tubular three dimensional structures. An example of a rod-like or tubular structure formed by a SADM of the type disclosed herein is depicted in FIG. 2A where the various moieties assemble to form a tubular structure having interior and exterior surfaces defining a central flow conduit. In such an embodiment, the SADMs assemble by having the oil-soluble moieties inside (e.g., forming an interior surface) the rod-like structure, providing a tubular conduit for hydrophobic fluid (e.g., oil or gas), as seen in FIG. 2A. In such an embodiment, the exterior of the rod-like structure would be hydrophilic, allowing for the flow of water.

Figure 2B:
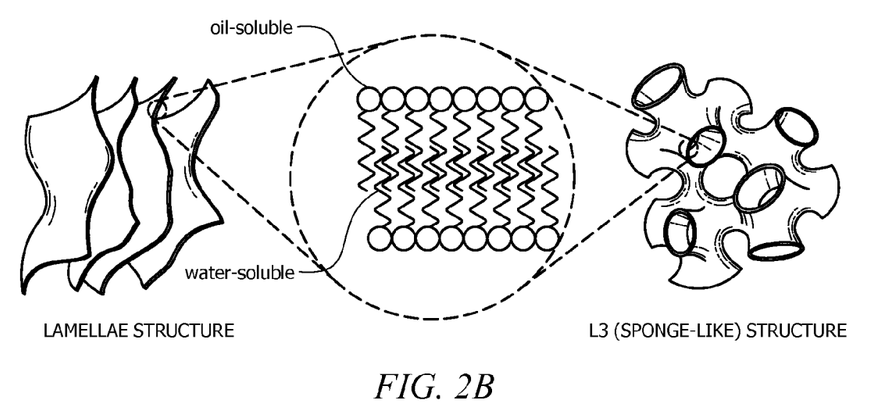

Alternatively, in an embodiment, the SADMs could assemble into lamellae structures under ambient wellbore conditions. An example of a lamellae structure formed by a SADM of the type disclosed herein is depicted in FIG. 2B. In the formation of lamellae structures, the water-soluble moieties would reside inside each sheet in the lamellae structure while the oil-soluble moieties would reside on the exterior surface of the sheets, providing a conduit for hydrophobic fluid (e.g., oil or gas) flow between the sheets. The lamellae structure may provide sheets of hollow channels for fluid flow (e.g., oil or gas) throughout the modified proppant pack.

Alternatively, the SADMs may assemble into sponge-like structures, referred to commonly as L3 structures, under ambient wellbore conditions. An example of a L3 structure formed by a SADM of the type disclosed herein is depicted in FIG. 2B. In the formation of the L3 structure, the water-soluble moieties reside on the inside of the structure and the oil-soluble moieties on the outside of the L3 structure, providing a conduit for hydrophobic fluid (e.g., oil or gas) flow. The L3 structure may provide interconnected hollow channels for fluid flow (e.g., oil or gas) throughout the modified proppant pack. The lamellae and L3 structures are described in more detail in Phys. Rev. Lett., vol. 93, p. 198301-1, 2004, which is incorporated by reference herein in its entirety.

As will be understood by one of ordinary skill in the art, the discrete structures formed by the proppant under ambient wellbore conditions are held together by the interactions of the SADM and proppant. Thus, the discrete structures formed by the modified proppant pack are reversible in nature. In an embodiment, a method of servicing a wellbore comprises stabilizing the discrete structures formed by the modified proppant pack. Herein stabilizing the discrete structures refers to reducing the reversibility of the process by which the discrete structures form in an effort to improve the structural integrity of the structures. In an embodiment, the discrete structures are stabilized by crosslinking the crosslinkable moiety of the SADM.

Crosslinking of the crosslinkable moiety of the SADM may be carried out using any suitable methodology. For example, materials that promote crosslinking of the crosslinkable moiety may be contacted with the modified proppant pack. As will be understood by one of ordinary skill in the art, the type of material that promotes crosslinking of the crosslinkable moiety will depend on the nature of the crosslinkable moiety. For example, crosslinkable moieties comprising sugars or sugar derivatives may be crosslinked by the addition of boronic acid. In another embodiment, the crosslinkable moiety comprises benzenediols or benzenediol derivatives which may crosslinked by zirconium or aluminum-containing complexes such as aluminum sulfate or zirconium lactate. In an embodiment, the crosslinker comprises CLEANLINK crosslinker. CLEANLINK crosslinker is a crosslinking agent commercially available from Halliburton Energy Services, Inc.

In an embodiment, the crosslinkable moiety comprises cyclic succinate species such as succinic anhydride. In such embodiments, the crosslinkable moiety may be crosslinked under basic conditions at a pH of about 8.5 and temperatures of about 125° F., alternatively at a pH from about 6 to about 12 and a temperature ranging from about 75° F. to about 350° F., or alternatively at a pH from about 7 to about 10 and a temperature ranging from about 100° F. to about 200° F.

Alternatively, the crosslinkable moiety comprises a furanyl species. In such embodiments, the crosslinkable moiety may be crosslinked under acidic conditions at a pH of about 5, alternatively at a pH of from about 0 to about 7.5, or alternatively at a pH of from about 4 to about 6.

Crosslinking of the crosslinkable moiety by contact with a material (e.g., boronic acid), or through a change in conditions (e.g., increase temperature, decrease pH) may be carried out using any suitable methodology. For example, agents or materials that promote crosslinking of the crosslinkable moiety may be contacted with the modified proppant pack sometime after introduction of the modified proppant pack to the wellbore. In an embodiment, crosslinking of the crosslinkable moiety may be carried out in a controlled fashion such that contact of the crosslinking agent with the crosslinkable moiety occurs after a period of time and/or over a period of time. For example, the crosslinking agent may be encapsulated when placed in contact with the crosslinkable moiety. In such instances contact of the crosslinking agent with the crosslinkable moiety occurs after release of the crosslinking agent from encapsulation. Alternatively, the crosslinking agent may comprise an acid-precursor or base-precursor. In such embodiments, the acid-precursor or base-precursor may be acted upon by one or more conditions (e.g., temperature) and be converted to an acid or a base, respectively. In such instances, contact of the crosslinking agent with the crosslinkable moiety occurs after transformation of the acid precursor or base precursor to an acid or base respectively. Nonlimiting examples of mechanisms of controlling the timing and/or extent to which the crosslinking agent contacts the crosslinkable moiety includes the use acid-generating materials, acid precursors, base-generating materials, autocatalytic agents, encapsulated materials, and the like and are described in more detail in U.S. Patent Application No. 20120004148 A1 and U.S. Pat. Nos. 7,325,615; 7,297,665; 5,372,732; and 4,488,975; each of which is incorporated by reference herein in its entirety

In an embodiment, the SADM comprises a siloxane-based oil-soluble moiety that is linked to a nanoparticle. The nanoparticle may comprise silica or alumina and is characterized by having at least one dimension with an average size of equal to or less than about 1 nm. In an embodiment, the SADM serves as a templating agent which directs the assembly of nanoparticles into discrete structures of the type disclosed herein.

In an embodiment, the SADM comprises a surfactant comprising polyethylene glycol as the water-soluble moiety, polyethylene as the oil-soluble moiety, and galactose as the crosslinkable moiety. In such embodiments, the SADM is associated with a proppant of the type disclosed herein (e.g., resin-coated sand) to form a modified proppant pack. The modified proppant pack may be introduced to a formation and enter one or more permeable zones within the formation. Upon entry into the formation the modified proppant pack may self-assemble into discrete structures of the type disclosed herein. In an embodiment the discrete structures are contacted with boronic acid at a pH of about 8.5 which results in crosslinking of the crosslinkable moiety and increases the stability or structural integrity of the assembled modified proppant pack. In such an embodiment, the crush strength of the proppant is increased by about 10%, alternatively about 20% or alternatively about 30% when compared to the crush strength of the same proppant pack lacking a SADM. Crush strength may be measured using any suitable methodology. For example, the crush strength may be measured according to the American Petroleum Institute Recommended Practice 60 (RP 60). In an embodiment, migration of the proppant under closure pressure (i.e., when the fracturing pressure is removed) is reduced by about 20%, alternatively by about 25, 30, 35, 40, 45, or 50% when compared to migration of the proppant pack lacking a SADM.

In an embodiment, the SADM comprises a surfactant comprising polyacrylic acid as the water-soluble moiety, polyethylene as the oil-soluble moiety, and catechol as the crosslinkable moiety. In an embodiment, the SADM is associated with a proppant of the type disclosed herein (e.g., resin-coated sand) to form a modified proppant pack. The modified proppant pack may be introduced to a formation and enter one or more permeable zones within the formation. Upon entry into the formation the modified proppant pack may self-assemble into discrete structures of the type disclosed herein. In an embodiment the stability or structural integrity of the discrete structures are increased by crosslinking the catechols in the presence a crosslinking agent that releases Al species very slowly (e.g., aluminum lactate or aluminum carboxylate), which are then activated upon release.

In an embodiment, the SADM comprises a compound characterized by Formula I:

Formula I wherein the water soluble moiety comprises a triethylene glycol, the oil soluble moiety comprises a di-isopropyl substituted cyclohexane, and the crosslinkable moiety comprises a 1,2,4-butanetriol. In an embodiment, the SADM is associated with a sand proppant to form a modified proppant pack. Upon placement into the formation, the modified proppant pack may self-assemble into discrete structures of the type disclosed herein. In an embodiment the stability or structural integrity of the discrete structures are increased by crosslinking in the presence of zirconium lactate.

Modified proppant packs of the typed disclosed herein may be included in any suitable WSF. As used herein, a "servicing fluid" refers to a fluid used to drill, complete, work over, fracture, repair, or in any way prepare a wellbore for the recovery of materials residing in a subterranean formation penetrated by the wellbore. Examples of servicing fluids include, but are not limited to, cement slurries, drilling fluids or muds, spacer fluids, lost circulation fluids, fracturing fluids or completion fluids. It is to be understood that "subterranean formation" encompasses both areas below exposed earth and areas below earth covered by water such as ocean or fresh water.

In an embodiment, the modified proppant pack may be included in WSFs that are employed in well completion operations such as fracturing operations. In an embodiment, the modified proppant pack is utilized during a hydraulic fracturing operation. Hydraulic fracturing refers to the propagation of fractures in a rock layer caused by the presence of a pressurized fluid. The modified proppant pack may then be injected into the resultant fractures (or fracture network) to hold the fractures open after the pressure is released. In an embodiment, the modified proppant pack and a crosslinking agent are placed about concurrently in the downhole formation. Self-assembly of the modified proppant pack may take place either prior to placement into the wellbore, or upon placement into the wellbore formation. Modified proppant packs of the type disclosed herein may provide an oil-wet surface for a more efficient fluid (e.g., oil or gas) flow, and structural support for the downhole formation fractures.

During or subsequent to the wellbore servicing operation a proppant pack may be subject to one or more wellbore conditions such as pressure that result in degradation of the conventional proppant pack (e.g., proppant crushing) generating fines that could migrate and lower the fluid conductivity of the proppant pack. In an embodiment, the modified proppant pack provides an increased structural integrity when exposed to conditions typically encountered in the wellbore formation fractures when compared to a proppant pack lacking a SADM. Additionally, a modified proppant pack of the type disclosed herein may have an increased deformability while still retaining porosity areas for fluid flow when compared to a proppant pack lacking a SADM. In an embodiment, the discrete structures formed by the modified proppant pack may increase the conductivity of the wellbore by providing an increased number of flow channels, thus allowing for better fluid flow during proppant packing and/or gravel packing.

In an embodiment, the discrete structures formed by the modified proppant pack provide a distinct oil-wet surface and contemporaneously a distinct water-wet surface that allows for the simultaneous collection of both hydrocarbons and water while avoiding the formation of emulsions which are known to clog the pores in the formation.

In an embodiment, the modified proppant pack may be used for penetration into the near-wellbore region, alternatively the modified proppant pack may penetrate the fracture into the also known as the far-wellbore region. If the modified proppant pack is used in conjunction with a conventional proppant pack, such as sand, the conventional proppant pack may reside in the near-wellbore region while the surfactant could travel further and reach the far-wellbore region where it could form polymer networks allowing for a more efficient fluid flow on longer distances. The near-wellbore region delimitation is dependent upon the formation where the wellbore is located, and is based on the wellbore surrounding conditions. The far-wellbore region is different from the near-wellbore region in that it is subjected to an entirely different set of conditions and/or stimuli. In an embodiment, the near-wellbore and far-wellbore regions are based on the fracture length propagating away from the wellbore. The near-wellbore region refers to about the first 20% of the fracture length propagating away from the wellbore (e.g., 50 feet) whereas the far-wellbore region refers to a length that is greater than about 20% of the fracture length propagating away from the wellbore (e.g., greater than about 50 feet). In an example, the modified proppant pack described in the present disclosure may be used for fracturing penetration distances of about 2 miles, alternatively about 1000 feet, alternatively about 200 feet, alternatively about 20 feet, alternatively about 20 in., alternatively about 2 in.

Additional Disclosure

The following are nonlimiting, specific embodiments in accordance with the present disclosure:

A first embodiment, which is a method of servicing a wellbore penetrating a formation comprising placing a wellbore servicing fluid comprising a modified proppant pack into the wellbore or formation wherein the modified proppant pack comprises a proppant and a self-assembly directing material (SADM).

A second embodiment, which is the method of the first embodiment wherein the SADM comprises a surfactant.

A third embodiment, which is the method of the second embodiment wherein the surfactant comprises a water-soluble moiety, an oil-soluble moiety, and a crosslinkable moiety.

A fourth embodiment, which is the method of the third embodiment wherein the water-soluble moiety comprises a moiety derived from polyethylene glycols, polyacrylic acid, polyacrylamide, polyacrylonitrile, polyethylene, polystyrene, or combinations thereof.

A fifth embodiment which is the method of one of the third through fourth embodiments, wherein the water-soluble moiety comprises a polyacrylate characterized by Structure II:

Structure II wherein $R_1$ is hydrogen, a $C_1$-$C_{16}$ alkyl group, or combinations thereof.

A sixth embodiment which is the method of one of the third through fifth embodiments, wherein the water-soluble moiety comprises a polyacrylamide derivative characterized by Structure III:

Structure III wherein $R_2$ is selected from the group consisting of: hydrogen, a $C_1$-$C_{16}$ alkyl group, and any combination thereof.

A seventh embodiment which is the method of one of the third through sixth embodiments, wherein the water-soluble moiety comprises a polyethylene phosphonate characterized by Structure IV:

Structure IV

An eighth embodiment which is the method of one of the third through seventh embodiments, wherein the oil-soluble moiety comprises Al-based compounds, Si-based compounds, cyclic structures with side chains, compounds characterized by Structure V, and/or Structure VI, or combinations thereof Structure V

Structure VI wherein $R_3$ and $R_4$ are hydrogen, a $C_1$-$C_{16}$ alkyl group, or combinations thereof.

A ninth embodiment which is the method of one of the third through eighth embodiments, wherein the oil-soluble moiety comprises a hydrophobic siloxane compound characterized by Structure VII:

Structure VII wherein $R_5$ is a $C_1$-$C_{16}$ alkyl group.

A tenth embodiment which is the method of one of the third through ninth embodiments, wherein the crosslinkable moiety comprises sugars, benzenediols furanyl, tetrahydrofuran derivatives, cyclic succinate, malonate, gallate, polyvinyl alcohol or combinations thereof.

An eleventh embodiment which is the method of one of the third through tenth embodiments, wherein the crosslinkable moiety comprises a sugar derivative of the type characterized by Structure VIII.

Structure VIII

A twelfth embodiment which is the method of one of the third through eleventh embodiments, wherein the crosslinkable moiety comprises a catechol derivative of the type characterized by Structure IX.

Structure IX

A thirteenth embodiment which is the method of one of the third through twelfth embodiments, wherein the crosslinkable moiety comprises a succinic anhydride derivative of the type characterized by Structure X.

Structure X

A fourteenth embodiment which is the method of one of the third through thirteenth embodiments, wherein the crosslinkable moiety comprises a furanyl derivative of the type characterized by Structure XI.

Structure XI

A fifteenth embodiment which is the method of one of the first through fourteenth embodiments, wherein the modified proppant pack self-assembles into a plurality of discrete structures within one or more fractures in the wellbore.

A sixteenth embodiment which is the method of one of the first through fifteenth embodiments, wherein the wellbore servicing fluid comprises a fracturing fluid.

A seventeenth embodiment which is the method of one of the first through sixteenth embodiments, wherein the proppant comprises nutshells, fruit seeds, particulate wood, glass, sintered bauxite, quartz, aluminum pellets, silica (sand), synthetic organic particles, nylon pellets, ceramics, or combinations thereof.

An eighteenth embodiment which is the method of one of the first through seventeenth embodiments, further comprising placing a crosslinking agent into the wellbore.

A nineteenth embodiment, which is the method of the eighteenth embodiment wherein the crosslinking agent comprises boronic acid, Zr- or Al-containing complexes, aluminum sulfate, aluminum lactate, zirconium lactate, or combinations thereof.

A twentieth embodiment, which is a modified proppant pack comprising a proppant and a self-assembly directing material comprising a water-soluble moiety, an oil-soluble moiety and a crosslinkable moiety.

A twenty-first embodiment, which is the modified proppant pack of the twentieth embodiment wherein the water-soluble moiety comprises polyacrylamide.

A twenty-second embodiment, which is the modified proppant pack of one of the twentieth through twenty-first embodiments wherein the oil-soluble moiety comprises siloxane.

A twenty-third embodiment, which is the modified proppant pack of one of the twentieth through twenty-second embodiments wherein the crosslinkable moiety comprises catechol.

A twenty-fourth embodiment, which is the modified proppant pack of one of the twentieth through twenty-third embodiments wherein the proppant comprises sand.

A twenty-fifth embodiment, which is the modified proppant pack of one of the twentieth through twenty-fourth embodiments further comprising a crosslinking agent.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k^*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore penetrating a formation comprising placing a wellbore servicing fluid comprising a modified proppant pack into the wellbore or formation, wherein the modified proppant pack comprises a proppant and a self-assembly directing material (SADM) that comprises a surfactant comprising a water-soluble moiety, an oil-soluble moiety, and a crosslinkable moiety; wherein the water-soluble moiety comprises at least one moiety selected from the group consisting of:

(a) a polyethylene glycol characterized by Structure I:

Structure I (b) a polyacrylate characterized by Structure II, wherein $R_1$ is selected from the group consisting of: hydrogen, a $C_1$-$C_{16}$ alkyl group, and any combination thereof:

Structure II (c) a polyacrylamide derivative characterized by Structure III, wherein $R_2$ is selected from the group consisting of: hydrogen, a $C_1$-$C_{16}$ alkyl group, and any combination thereof:

Structure III

(d) a polyethylene phosphonate characterized by Structure IV:

Structure IV

(e) any combination thereof; and wherein the crosslinkable moiety comprises catechol of the type characterized by Structure IX:

Structure IX

2. The method of claim 1 wherein the oil-soluble moiety comprises at least one moiety selected from the group consisting of: an Al-based compound, a Si-based compound, a cyclic structures with side chains, a compound characterized by Structure V and/or Structure VI, and any combination thereof:

Structure V

-continued

Structure VI wherein $R_3$ and $R_4$ are hydrogen, a $C_1$-$C_{16}$ alkyl group, or combinations thereof.

3. The method of claim 1 wherein the oil-soluble moiety comprises a hydrophobic siloxane compound characterized by Structure VII:

Structure VII wherein $R_5$ is a $C_1$-$C_{16}$ alkyl group.

4. The method of claim 1 wherein the modified proppant pack self-assembles into a plurality of discrete structures within one or more fractures in the wellbore.

5. The method of claim 1 wherein the wellbore servicing fluid comprises a fracturing fluid.

6. The method of claim 1 wherein the proppant comprises nutshells, fruit seeds, particulate wood, glass, sintered bauxite, quartz, aluminum pellets, silica (sand), synthetic organic particles, nylon pellets, ceramics, or combinations thereof.

7. The method of claim 1 further comprising placing a cros slinking agent into the wellbore.

8. The method of claim 7 wherein the crosslinking agent comprises boronic acid, Zr- or Al-containing complexes, aluminum sulfate, aluminum lactate, zirconium lactate, or combinations thereof.

9. A method of servicing a wellbore penetrating a formation comprising:
   placing a wellbore servicing fluid comprising a modified proppant pack into the wellbore or formation,
      wherein the modified proppant pack comprises a proppant and a self-assembly directing material (SADM) that comprises a surfactant comprising a water-soluble moiety, an oil-soluble moiety, and a crosslinkable moiety;
      wherein the water-soluble moiety comprises at least one moiety selected from the group consisting of:
      (a) a polyethylene glycol characterized by Structure I:

Structure I

(b) a polyacrylate characterized by Structure II, wherein $R_1$ is selected from the group consisting of: hydrogen, a $C_1$-$C_{16}$ alkyl group, and any combination thereof:

Structure II

(c) a polyacrylamide derivative characterized by Structure III, wherein $R_2$ is selected from the group consisting of: hydrogen, a $C_1$-$C_{16}$ alkyl group, and any combination thereof:

Structure III (d) a polyethylene phosphonate characterized by Structure IV:

Structure IV and (e) any combination thereof, and
wherein the crosslinkable moiety comprises catechol of the type characterized by Structure IX:

Structure IX and allowing the modified proppant pack to self-assemble into a plurality of discrete structures within one or more fractures in the wellbore, wherein the plurality of discrete structures are of a type selected from the group consisting of: a rod-like structure, a lamellae structure, a sponge-like structure, and any combination thereof.

10. The method of claim 9 wherein the SADM directs the self-assembly of the modified proppant pack.

* * * * *